United States Patent
Han et al.

(10) Patent No.: US 9,959,539 B2
(45) Date of Patent: May 1, 2018

(54) CONTINUAL AUTHORIZATION FOR SECURED FUNCTIONS

(71) Applicant: Apple Inc., Cupertino, CA (US)

(72) Inventors: Byron B. Han, San Jose, CA (US); Simon Patience, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 15/480,178

(22) Filed: Apr. 5, 2017

(65) Prior Publication Data

US 2017/0206528 A1    Jul. 20, 2017

Related U.S. Application Data

(63) Continuation-in-part of application No. 14/667,638, filed on Mar. 24, 2015, which is a continuation of application No. 13/798,000, filed on Mar. 12, 2013.

(60) Provisional application No. 61/666,730, filed on Jun. 29, 2012.

(51) Int. Cl.
    *G06Q 20/40* (2012.01)
(52) U.S. Cl.
    CPC ... *G06Q 20/40145* (2013.01); *G06Q 20/4014* (2013.01); *H04L 2463/102* (2013.01)
(58) Field of Classification Search
    CPC .......... G06Q 20/40145; G06Q 20/4014; H04L 2463/102
    See application file for complete search history.

(56) References Cited

U.S. PATENT DOCUMENTS

| | | | |
|---|---|---|---|
| 5,872,834 | A | 2/1999 | Teitelbaum |
| 6,256,737 | B1 | 7/2001 | Bianco et al. |
| 6,400,836 | B2 | 2/2002 | Senior |
| 6,795,569 | B1 | 9/2004 | Setlak |
| 6,845,453 | B2 | 1/2005 | Scheidt et al. |
| 6,975,202 | B1 | 12/2005 | Rodriguez et al. |
| 7,046,139 | B2 | 5/2006 | Kuhn et al. |
| 7,065,184 | B2 | 6/2006 | Vishik et al. |

(Continued)

FOREIGN PATENT DOCUMENTS

| | | |
|---|---|---|
| CN | 1268234 | 9/2000 |
| CN | 1695163 | 11/2005 |

(Continued)

OTHER PUBLICATIONS

Islam et al., "A Biometrics-Based Secure Architecture for Mobile Computing," systems, Applications and Technology Conference (LISAT), 2012 IEEE Long Island, May 4, 2012, pp. 1-5, XP032192493, Section III: Proposed Architecture.

*Primary Examiner* — Meng Li
(74) *Attorney, Agent, or Firm* — Brownstein Hyatt Farber Schreck, LLP

(57) ABSTRACT

A computing device may determine to execute a secured function. The computing may obtain a biometric of the user of the computing device utilizing one or more biometric sensors associated with the computing device, determine that the biometric matches the biometric of a user authorized to utilize the secured function, and execute the secured function. Whenever during execution of the secured function the computing device determines that the biometric sensor no longer detects the biometric of the user, the computing device may cease execution of the secured function.

18 Claims, 3 Drawing Sheets

(56) References Cited

U.S. PATENT DOCUMENTS

| | | |
|---|---|---|
| 7,110,987 B2 | 9/2006 | Engelhart |
| 7,210,620 B2 | 5/2007 | Jones |
| 7,246,244 B2 | 7/2007 | Nanavati et al. |
| 7,269,737 B2 | 9/2007 | Robinson |
| 7,278,025 B2 | 10/2007 | Saito et al. |
| 7,502,761 B2 | 9/2009 | Siegal et al. |
| 7,617,399 B2 | 11/2009 | Ebata |
| 7,769,845 B2 | 8/2010 | Baron |
| 7,809,954 B2 | 10/2010 | Miller et al. |
| 7,849,013 B2 | 12/2010 | Engelhart |
| 7,864,987 B2 | 1/2011 | Venkatanna et al. |
| 7,941,664 B2 | 5/2011 | Wheeler |
| 7,953,671 B2 | 5/2011 | Bishop et al. |
| 7,980,378 B2 | 7/2011 | Jones et al. |
| 8,028,896 B2 | 10/2011 | Carter et al. |
| 8,060,413 B2 | 11/2011 | Castell et al. |
| 8,063,889 B2 | 11/2011 | Anderson et al. |
| 8,064,658 B2 | 11/2011 | Iannone |
| 8,072,060 B2 | 12/2011 | Chou |
| 8,145,916 B2 | 3/2012 | Boshra et al. |
| 8,171,531 B2 | 5/2012 | Buer |
| 8,185,646 B2 | 5/2012 | Headley |
| 8,190,908 B2 | 5/2012 | Jazayeri et al. |
| 8,219,495 B2 | 7/2012 | Niwa |
| 8,230,232 B2 | 7/2012 | Ahmed et al. |
| 8,320,638 B2 | 11/2012 | Pitt et al. |
| 8,345,931 B2 | 1/2013 | Jeronimus |
| 8,369,845 B2 | 2/2013 | Zou et al. |
| 8,406,736 B2 | 3/2013 | Das et al. |
| 8,429,760 B2 | 4/2013 | Tribble |
| 8,473,748 B2 | 6/2013 | Sampas |
| 8,566,955 B2 | 10/2013 | Brosnan et al. |
| 8,572,707 B2 | 10/2013 | Tuchman et al. |
| 8,621,561 B2 | 12/2013 | Cross et al. |
| 8,627,417 B2 | 1/2014 | Aoyama |
| 8,627,454 B2 | 1/2014 | Bolyukh |
| 8,635,165 B2 | 1/2014 | Beenau |
| 8,660,322 B2 | 2/2014 | Tsai et al. |
| 8,682,798 B2 | 3/2014 | Patterson |
| 8,745,490 B2 | 6/2014 | Kim |
| 8,745,716 B2 | 6/2014 | Brudnicki |
| 8,762,276 B2 | 6/2014 | Lepisto et al. |
| 8,799,670 B2 | 8/2014 | Naccache |
| 8,839,371 B2 | 9/2014 | Ghosh |
| 8,905,303 B1 | 12/2014 | Ben Ayed |
| 8,943,326 B2 | 1/2015 | Tamkhane et al. |
| 8,943,580 B2 | 1/2015 | Fadell et al. |
| 8,966,076 B2 | 2/2015 | Kawana et al. |
| 9,098,510 B2 | 8/2015 | Seryakov et al. |
| 9,119,067 B2 | 8/2015 | Santamaria et al. |
| 9,203,845 B2 | 12/2015 | Webber |
| 9,208,337 B2 | 12/2015 | Tayloe |
| 9,411,037 B2 | 8/2016 | Jamtgaard et al. |
| 9,699,168 B2 | 7/2017 | Pieczul et al. |
| 9,723,482 B2 | 8/2017 | Wang et al. |
| 2002/0018585 A1 | 2/2002 | Kim |
| 2002/0056043 A1 | 5/2002 | Glass |
| 2002/0073416 A1 | 6/2002 | Ramsey Catan |
| 2002/0095586 A1* | 7/2002 | Doyle ............... G06F 21/32 |
| | | 713/186 |
| 2002/0174345 A1 | 11/2002 | Patel |
| 2003/0040339 A1 | 2/2003 | Chang |
| 2003/0046237 A1 | 3/2003 | Uberti |
| 2003/0156740 A1 | 8/2003 | Siegel et al. |
| 2004/0031845 A1 | 2/2004 | Solomon |
| 2004/0044627 A1 | 3/2004 | Russell |
| 2005/0116026 A1 | 6/2005 | Burger et al. |
| 2005/0154920 A1 | 7/2005 | Tartaglia et al. |
| 2005/0229006 A1 | 10/2005 | deMoura et al. |
| 2005/0259813 A1* | 11/2005 | Wasilewski ............ H04H 20/78 |
| | | 380/28 |
| 2006/0173793 A1 | 8/2006 | Glass |
| 2006/0204048 A1 | 9/2006 | Morrison et al. |
| 2006/0234764 A1 | 10/2006 | Gamo et al. |
| 2007/0267478 A1 | 11/2007 | Turek et al. |
| 2008/0016371 A1 | 1/2008 | Jiang et al. |
| 2008/0097925 A1 | 4/2008 | King |
| 2008/0103984 A1 | 5/2008 | Choe et al. |
| 2008/0109871 A1 | 5/2008 | Jacobs |
| 2008/0148393 A1 | 6/2008 | Wendt |
| 2008/0195506 A1* | 8/2008 | Koretz ............... G06Q 30/0601 |
| | | 705/26.1 |
| 2009/0112754 A1 | 4/2009 | Seifert |
| 2009/0240622 A1* | 9/2009 | Zandonadi ............ G06Q 20/02 |
| | | 705/40 |
| 2010/0005509 A1 | 1/2010 | Peckover |
| 2010/0099383 A1 | 4/2010 | Yamagishi |
| 2010/0218012 A1 | 8/2010 | Joseph et al. |
| 2010/0241571 A1 | 9/2010 | McDonald |
| 2010/0321197 A1 | 12/2010 | Wong et al. |
| 2011/0082791 A1 | 4/2011 | Baghdasaryan et al. |
| 2011/0119479 A1 | 5/2011 | Cowie et al. |
| 2011/0138450 A1 | 6/2011 | Kesanupalli et al. |
| 2011/0166922 A1 | 7/2011 | Fuerstenberg |
| 2011/0238476 A1 | 9/2011 | Carr et al. |
| 2011/0246766 A1 | 10/2011 | O'Hare et al. |
| 2011/0291798 A1 | 12/2011 | Schibuk |
| 2011/0300829 A1 | 12/2011 | Nurmi et al. |
| 2012/0123841 A1* | 5/2012 | Taveau ............... G06Q 20/10 |
| | | 705/14.23 |
| 2012/0237908 A1 | 9/2012 | Fitzgerald et al. |
| 2012/0262399 A1 | 10/2012 | Colley et al. |
| 2012/0290376 A1 | 11/2012 | Dryer et al. |
| 2012/0330769 A1 | 12/2012 | Diaz Arceo |
| 2013/0067545 A1 | 3/2013 | Hanes |
| 2013/0124416 A1 | 5/2013 | Pawar et al. |
| 2013/0159699 A1 | 6/2013 | Torkkel |
| 2013/0254906 A1 | 9/2013 | Kessler et al. |
| 2013/0298224 A1 | 11/2013 | Heilpern |
| 2014/0006795 A1 | 1/2014 | Han et al. |
| 2014/0007185 A1 | 1/2014 | Han et al. |
| 2014/0007223 A1 | 1/2014 | Han et al. |
| 2014/0136419 A1 | 5/2014 | Kiyohara |
| 2014/0189807 A1 | 7/2014 | Cahill et al. |
| 2014/0279516 A1 | 9/2014 | Rellas et al. |
| 2015/0033305 A1 | 1/2015 | Shear |
| 2015/0073998 A1 | 3/2015 | Alsina et al. |
| 2015/0074796 A1 | 3/2015 | Meir et al. |
| 2015/0081552 A1 | 3/2015 | Stewart |
| 2015/0116086 A1 | 4/2015 | Kim et al. |
| 2015/0186892 A1 | 7/2015 | Zhang et al. |
| 2015/0199687 A1 | 7/2015 | Han et al. |
| 2015/0220931 A1 | 8/2015 | Alsina et al. |
| 2015/0294382 A1 | 10/2015 | Alsina et al. |
| 2015/0304323 A1 | 10/2015 | Alsina et al. |
| 2016/0182508 A1 | 6/2016 | Gresham et al. |
| 2016/0248769 A1 | 8/2016 | Han et al. |

FOREIGN PATENT DOCUMENTS

| | | |
|---|---|---|
| CN | 1783052 | 6/2006 |
| CN | 1983336 | 6/2007 |
| CN | 101075282 | 11/2007 |
| CN | 101256700 | 9/2008 |
| CN | 101261679 | 9/2008 |
| CN | 101827148 | 9/2010 |
| CN | 101933051 | 12/2010 |
| CN | 102088353 | 6/2011 |
| CN | 103037065 | 4/2013 |
| CN | 103220637 | 7/2013 |
| CN | 103221958 | 7/2013 |
| CN | 103268550 | 8/2013 |
| CN | 103295129 | 9/2013 |
| DE | 202005003042 | 11/2006 |
| DE | 102009027682 | 1/2011 |
| DE | 102012202731 | 8/2013 |
| EP | 1857954 | 11/2007 |
| EP | 2226741 | 9/2010 |
| EP | 2114051 | 6/2012 |
| EP | 2533172 A1 | 12/2012 |
| EP | 2597585 | 5/2013 |
| GB | 2447752 | 9/2008 |
| JP | A 2010140174 | 6/2010 |
| JP | A 2011192288 | 9/2011 |

(56) References Cited

FOREIGN PATENT DOCUMENTS

| | | |
|---|---|---|
| KR | 1020120122181 | 11/2012 |
| TW | I236634 | 7/2005 |
| TW | 200901724 | 1/2009 |
| TW | 200919255 | 5/2009 |
| TW | 201319817 | 5/2013 |
| WO | WO 03/062969 | 7/2003 |
| WO | WO 08/004312 | 1/2008 |
| WO | WO 08/030184 | 3/2008 |
| WO | WO 13/095434 | 6/2013 |

* cited by examiner

CONTINUAL AUTHORIZATION FOR SECURED FUNCTIONS

CROSS-REFERENCE TO RELATED APPLICATION

The present application is a continuation-in-part of U.S. patent application Ser. No. 14/667,638, which was filed on Mar. 24, 2015, and entitled "Continual Authorization for Secured Functions," which is a continuation of U.S. patent application Ser. No. 13/798,000, which was filed on Mar. 12, 2013, and entitled "Continual Authorization for Secured Functions," which claims the benefit under 35 U.S.C. § 119(e) to U.S. Provisional Patent Application No. 61/666,730, which was filed on Jun. 29, 2012, and entitled "Continual Authorization for Secured Functions," each of which is incorporated by reference as if fully disclosed herein.

FIELD OF THE INVENTION

This disclosure relates generally to authorization for secured functions, and more specifically to continual authorization verification during performance of secured functions.

BACKGROUND

Computing devices (such as smart phones, laptop computers, desktop computers, server computers, mobile computers, tablet computers, digital music players, digital video players, and other such computing devices) may be capable of performing a variety of functions. Such functions may include executing applications such as web browsers, productivity software, games, playing media (such as images, audio, video, music, and other such media), electronic mail clients, and/or any other software application. In some cases, such functions may be performed in response to one or more instructions received from one or more users via one or more input/output devices.

In some cases, a computing device may be configured to require one or more credentials proving authorization for performing one or more functions, referred to as "secured functions." Such configuration may be the result of default settings, user specified preferences stored by the computing device, use policies dictated by one or more enterprise servers when the computing device is used in an enterprise setting, and so on. For example, a secured function that may require credentials before performance may be providing a purchasing interface for purchasing digital content (such as image files, music or other audio files, video files, software applications, and other such digital content) for the computing device. When the computing device determines to provide the purchasing interface (such as in response to a user request for the purchasing interface), the computing device may require one or more credentials proving authorization before the computing device provides the purchasing interface. Such credentials may be provided by the user, may be stored by the computing device (such as in one or more cookies), and/or may be otherwise similarly provided before the computing device provides the purchasing interface.

For example, when a user requests the purchasing interface, the computing device may prompt the user for a password. The computing device may compare a password provided by the user with a stored password (such as by encrypting the user provided password with an encrypted version of the stored password) that is associated with an appropriate authorization to execute the purchasing interface. If the user provided password matches the stores password the computing device determines that the user is authorized to access the purchasing interface and provides the purchasing interface accordingly.

In general, computing devices do not require users to continuously provide passwords or other credentials constantly. Typically, a computing device obtains credentials proving authorization from a user to access the secured function for a period of time often referred to as the "grace period" (which may be ten seconds, one hour, until the computing device or the software application utilized to access the secured function restarts, or any other such period of time). Such a grace period is often utilized in order to avoid overburdening the user with authorization credential requests, because constant providing of authorization credentials such as passwords is not feasible, and other such reasons. Once the user has provided credentials proving authorization, it is often assumed that the user will continue to remain the user and thus continue to be authorized to utilize the secured function.

However, users may not retain control of a computing device during such a grace period. For example, a mother may enter her password on her smart phone in order to purchase one or more songs to use on the phone. She may then put her phone down and not pay attention, thus enabling her toddler to pick up the phone and play with it. In this case, the grace period may not have elapsed since the mother entered her password. As such, the toddler may inadvertently (simply by playing with the phone) purchase any number of songs for her mother's phone. Likely, the mother will neither want the songs nor want to pay for them. As such, though the smart phone required the mother to enter her password to purchase songs, the smart phone was still unable to prevent the unauthorized purchases.

SUMMARY

The present disclosure discloses systems and methods for continual authorization for secured functions. A computing device may determine to execute a secured function. In some cases, the computing device may make such a determination in response to a user request to execute the secured function. The computing may obtain a biometric of the user of the computing device. The biometric may be detected utilizing one or more biometric sensors associated with the computing device, such as a fingerprint detected utilizing one or more fingerprint sensors, a facial image detected utilizing one or more cameras, and so on. The computing device may determine that the biometric matches the fingerprint of a user authorized to utilize the secured function. Then, the computing device may execute the secured function. It should be appreciated that embodiments described herein may be used with any suitable sensor, including swipe or strip sensors, two-dimensional array sensors, and the like.

Whenever (during execution of the secured function) the computing device determines that the biometric sensor no longer detects the biometric of the user, the computing device may cease execution of the secured function. As such, the user may continue to provide the user's biometric to the touch I/O device as long as the user desires that execution of the secured function continue.

In this way, the computing device may be able to ensure that the user using the computing device is appropriately authorized throughout execution of the secured function. Unlike with authentication methods that allow use during grace periods after authentication, the computing device may cease executing the secured function if the computing device cannot constantly ensure that the authorized user remains in control of the computing device. Thus, security of access to secured functions provided via computing devices may be improved without adding significant burden to users.

In various implementations, various factors (such as which functions require authentication and what authentication such secured functions require) may be determined based at least on one or more user preferences, defaults, enterprise policies, function settings, and/or other such specifications. As such, control of such factors may be provided in a granular, powerful, and flexible fashion to users, enterprise administrators, account holders, device manufacturers, function developers, security personnel, and/or other such related parties.

In one or more implementations, the computing device may store information for authenticating the user biometric and may itself perform such authentication. However, in other implementations such information storage and/or authentication may be performed by one or more other computing devices with which the computing device communicates.

Further, in some implementations the biometric sensor utilized by the computing device to authenticate the user may not be directly connected to the computing device. In such implementations, the biometric sensor may be connected to another computing device with which the computing device communicates that the authorized user can utilize to provide the user's biometric and authorize execution of one or more secured functions. In this way, a user may be able authorize a computing device to securely execute one or more secured functions without having to be physically present at the computing device.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

The description that follows includes sample systems, methods, and computer program products that embody various elements of the present disclosure. However, it should be understood that the described disclosure may be practiced in a variety of forms in addition to those described herein.

The present disclosure discloses systems and methods for continual authorization for secured functions. A processing unit of a computing device may determine to execute a secured function (such as in response to a user request to execute the secured function). The processing unit may obtain at least one biometric of the user of the computing device detected utilizing one or more biometric sensors (such as a fingerprint detected by a fingerprint sensor, a facial image detected by a camera, and so on), determine that the biometric matches the biometric of a user authorized to utilize the secured function, and execute the secured function. Whenever the biometric sensor no longer detects the biometric of the user during execution of the secured function, the processing unit may immediately cease execution of the secured function. As such, the user may provide the user's biometric to the biometric sensor constantly as long as the user desires execution of the secured function to continue.

In this way, the computing device may be certain throughout execution of the secured function that the user utilizing the secured function is appropriately authorized. Unlike with utilization of grace periods, execution of the secured function may immediately cease if the user does not remain in control of the computing device. If a parent utilizing such a secured function to purchase songs for their smart phone sets down the phone and the parent's child picks the phone up, the child will be unable to make purchases utilizing the parent's authorization. Thus, security of access to secured functions provided via computing devices may be improved without significant burden to users.

Figure 1:
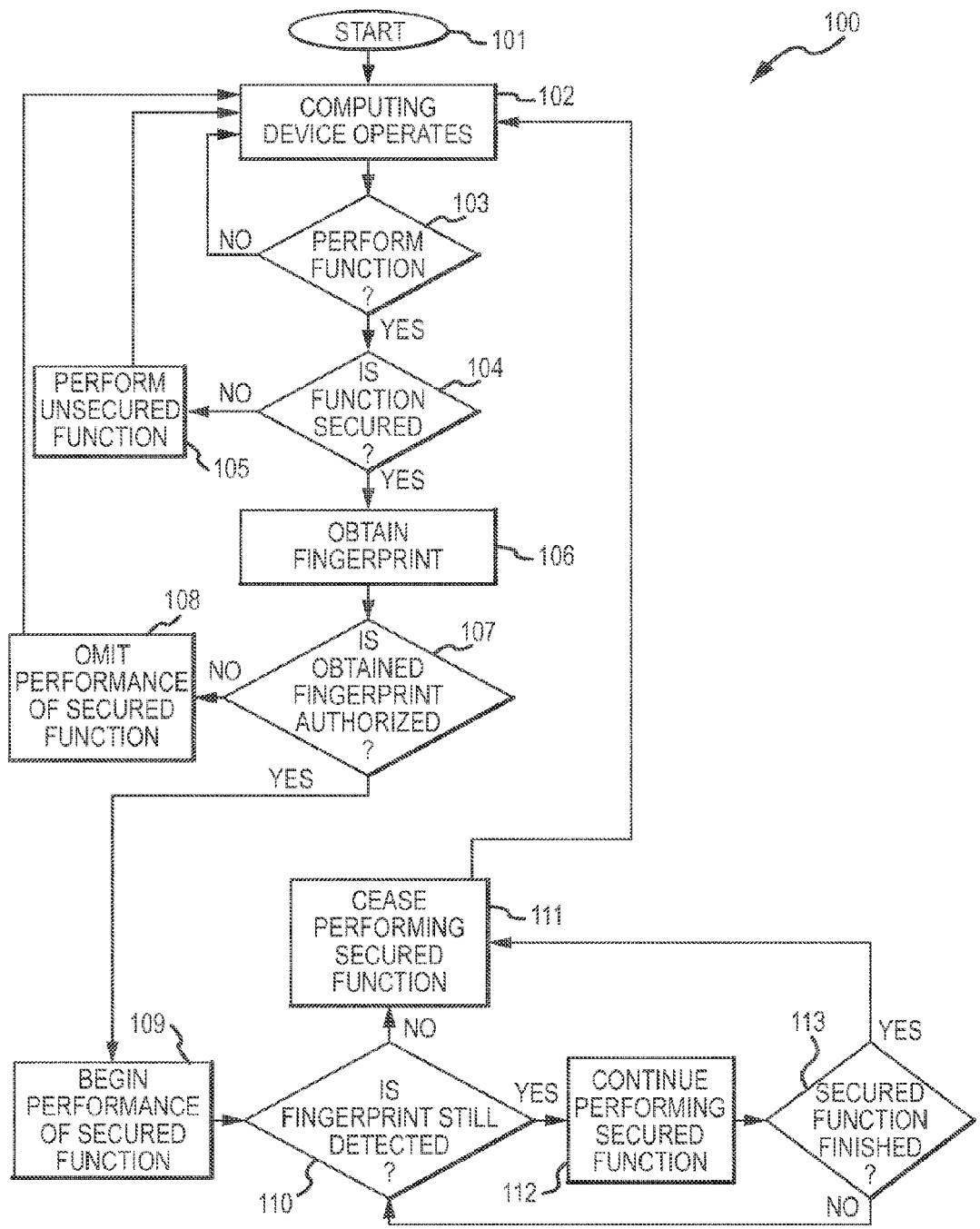
FIG. 1 is a flow illustrating a method for continual authorization for secured functions.

FIG. 1 illustrates a method 100 for continual authorization for secured functions. The flow begins at block 101 and proceeds to block 102 where a computing device operates. The flow then proceeds to block 103 where the computing device determines whether or not to execute a function. In some cases, the computing device may determine to execute a function in response to one or more user requests to perform the function. If so, the flow proceeds to block 104. Otherwise, the flow returns to block 102 where the computing device continues to operate.

At block 104, after the computing device determines to execute a function, the computing device determines whether or not the function is a secured function. Such a determination for a particular function may be based on one or more user preferences stored by the computing device (or another computing device with which the computing device communicates), one or more enterprise policies when the computing device is utilized in an enterprise computing context, one or more default settings, one or more settings of the particular function, and/or other such factors. If the computing device determines that the function is a secured function, the flow proceeds to block 106. Otherwise, the flow proceeds to block 105.

At block 105, after the computing device determines that the function is not a secured function (i.e., an unsecured function), the computing device performs the function. The flow then returns to block 102 where the computing device continues to operate.

At block 106, after the computing device determines that the function is a secured function, the computing device captures one or more user fingerprints utilizing a touch I/O device. The touch I/O device may be incorporated into the computing device as a component in some cases. The flow then proceeds to block 107.

At block 107, the computing device determines whether or not an authorization to utilize the function is associated with the fingerprint captured in block 106. This determination may include comparing the captured fingerprint against one or more stored fingerprints that are associated with authorization to utilize the function (such as by encrypting the captured fingerprint and comparing it against an encrypted version of the stored fingerprint). In some cases, the computing device may store the stored fingerprint and/or actually perform the comparison. In other cases, another computing device with which the computing device communicates may perform one or more of these operations (such as storing the stored fingerprint, performing the comparison and informing the computing device of the result, and so on). If the computing device determines that authorization to utilize the function is associated with the fingerprint captured in block 106, the flow proceeds to block 109. Otherwise, the flow proceeds to block 108.

At block 108, after the computing device determines that an authorization to utilize the function is not associated with the fingerprint captured in block 106, the computing device omits performance of the secured function. The flow then returns to block 102 where the computing device continues to operate.

At block 109, after the computing device determines that an authorization to utilize the function is associated with the fingerprint captured in block 106, the computing device begins performing the secured function. The flow then proceeds to block 110 where the computing device determines whether or not the captured fingerprint is still being detected by the touch I/O device (i.e., whether or not the user has left their finger touching the touch I/O device). If so, the flow proceeds to block 112. Otherwise, the flow proceeds to block 111.

At block 111, after the computing device determines that the captured fingerprint is not still being detected by the touch I/O device (i.e., the user has removed the user's finger from the touch I/O device), the computing device ceases performing the secured function. The flow then returns to block 102 where the computing device continues to operate.

At block 112, after the computing device determines that the captured fingerprint is still being detected by the touch I/O device (i.e., the user has not removed the user's finger from the touch I/O device), the computing device continues performing the secured function. The flow then proceeds to block 113

At block 113, the computing device determines whether or not performance of the secured function is finished. In some cases, the computing device may determine that performance of the secured function is finished if performance of the secured function has reached a terminal point (a point where the secured function ends). In other cases, the computing device may determine that performance of the secured function is finished if the user has requested that the secured function cease being performed.

If the computing device determines that performance of the secured function is finished, the flow proceeds to block 111 where the computing device ceases performance of the function. Otherwise, if the computing device determines that performance of the secured function is not finished, the flow returns to block 110 where the computing device whether or not the captured fingerprint is still being detected by the touch I/O device.

Although the method 100 is illustrated and described above as including particular operations performed in a particular order, it is understood that this is for the purposes of example. Other arrangements, which may include fewer and/or additional operations, are contemplated and are possible without departing from the scope of the present disclosure.

For example, though the method 100 is illustrated and described above as completely ceasing performance of the secured function if the user removes the user's finger from the touch I/O device, other actions are possible. In some cases, the computing device may merely pause performance of the function if the user removes the user's finger from the touch I/O device (possibly providing one or more error messages regarding the pause and requesting that the user replace the user's finger on the touch I/O device), wait for the user to replace the user's finger on the touch I/O device, and continue when the user complies.

By way of another example, though the method 100 is illustrated and described above as performing either secured or unsecured functions, various function security levels are possible. In some cases, a computing device may be capable of executing unsecured functions which require no authorization, low security functions which require users to provide authentication credentials (such as a password, a fingerprint, and/or other such authentication credentials) and then provide a grace period during which the low security functions may be executed, and high security functions which require user's to constantly provide a fingerprint associated with an appropriate authorization during execution of the high security functions in order for the high security functions to be performed. In such cases, the classification of a particular function as unsecured, low security, or high security may be determined based on one or more user preferences, defaults, enterprise policies, function settings, and/or other such factors.

In still another example, though the method 100 is illustrated and described above as requiring users only to constantly provide a fingerprint during execution of secured functions, such fingerprints may be combined with other authorization credentials in some implementations. In some cases, a user may be required to enter a password as well as keep the user's finger on a touch I/O device during execution of a secured function in order for the secured function to be executed.

Additionally, though the method 100 is illustrated and described above as obtaining a fingerprint utilizing a touch I/O device, in various implementations other biometrics may be obtained via other biometric sensors in order to provide continual authorization for secured functions. For example, a computing device may include one or more image capture devices, such as cameras, that may obtain one or more facial images of a user. When the computing device determines to execute a secured function, the computing device may only execute the secured function if a facial image of the current user is captured using a camera that matches the facial image of a user authorized to execute the secured function. Further, the computing device may only continue to execute the secured function as long as the user keeps the user's face in view of the camera.

Figure 2:
FIG. 2 is a block diagram illustrating a touch I/O device that can receive touch input for interacting with a computer system. The computer system may perform the method of FIG. 1.

Described embodiments may include touch I/O device 1001 that can receive touch input for interacting with computing system 1003 (FIG. 2) via wired or wireless communication channel 1002. The computing system 1003 may be configured to perform the method 100 of FIG. 1. Touch I/O device 1001 may be used to provide user input to computing system 1003 in lieu of or in combination with other input devices such as a keyboard, mouse, etc. One or more touch I/O devices 1001 may be used for providing user input to computing system 1003. Touch I/O device 1001 may be an integral part of computing system 1003 (e.g., touch screen on a laptop) or may be separate from computing system 1003.

Touch I/O device 1001 may include a touch sensitive panel which is wholly or partially transparent, semitransparent, non-transparent, opaque or any combination thereof. Touch I/O device 1001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensitive surface for receiving touch input.

In one example, touch I/O device 1001 embodied as a touch screen may include a transparent and/or semitransparent touch sensitive panel partially or wholly positioned over at least a portion of a display. According to this embodiment, touch I/O device 1001 functions to display graphical data transmitted from computing system 1003 (and/or another source) and also functions to receive user input. In other embodiments, touch I/O device 1001 may be embodied as an integrated touch screen where touch sensitive components/devices are integral with display components/devices. In still other embodiments a touch screen may be used as a supplemental or additional display screen for displaying supplemental or the same graphical data as a primary display and to receive touch input.

Touch I/O device 1001 may be configured to detect the location of one or more touches or near touches on device 1001 based on capacitive, resistive, optical, acoustic, inductive, mechanical, chemical measurements, or any phenomena that can be measured with respect to the occurrences of the one or more touches or near touches in proximity to device 1001. Software, hardware, firmware or any combination thereof may be used to process the measurements of the detected touches to identify and track one or more gestures. A gesture may correspond to stationary or non-stationary, single or multiple, touches or near touches on touch I/O device 1001. A gesture may be performed by moving one or more fingers or other objects in a particular manner on touch I/O device 1001 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 1003 may drive a display with graphical data to display a graphical user interface (GUI). The GUI may be configured to receive touch input via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1001 which may be associated with the graphical elements of the GUI. In other embodiments, the user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or mode of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 1002 in response to or based on the touch or near touches on touch I/O device 1001. Feedback may be transmitted optically, mechanically, electrically, olfactory, acoustically, or the like or any combination thereof and in a variable or non-variable manner.

In various implementations, one or more fingerprint sensors may be incorporated into the touch I/O device 1001, located underneath the touch I/O device 1001, incorporated into one or more other touch I/O devices (which may be different types of touch I/O device than the touch I/O device 1001), and so on.

Figure 3:
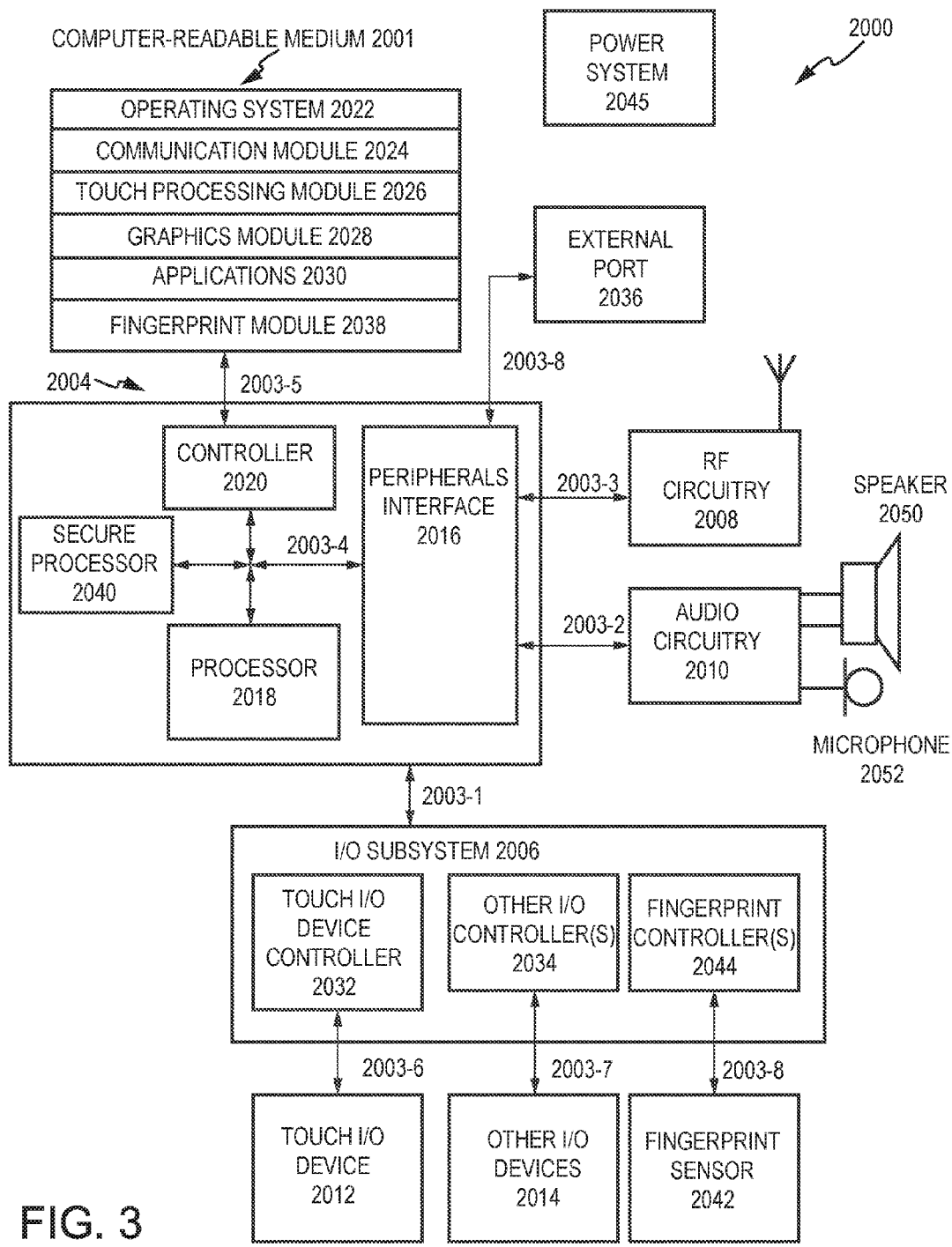
FIG. 3 is a block diagram illustrating computer system that includes a touch I/O device that can receive touch input for interacting with the computer system. The computer system may perform the method of FIG. 1.

Attention is now directed towards embodiments of a system architecture that may be embodied within any portable or non-portable device including but not limited to a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 2000, including combinations of two or more of these types of devices. FIG. 3 is a block diagram of one embodiment of system 2000 that generally includes one or more computer-readable mediums 2001, processing system 2004, Input/Output (I/O) subsystem 2006, radio frequency (RF) circuitry 2008 and audio circuitry 2010. These components may be coupled by one or more communication buses or signal lines 2003. Each such bus or signal line may be denoted in the form 2003-X, where X is a unique number. The bus or signal line may carry data of the appropriate type between components; each bus or signal line may differ from other buses/lines, but may perform generally similar operations. The system may be configured to perform the method 100 of FIG. 1.

It should be apparent that the architecture shown in FIG. 3 is only one example architecture of system 2000, and that system 2000 could have more or fewer components than shown, or a different configuration of components. The various components shown in FIG. 3 can be implemented in hardware, software, firmware or any combination thereof, including one or more signal processing and/or application specific integrated circuits.

RF circuitry 2008 is used to send and receive information over a wireless link or network to one or more other devices and includes well-known circuitry for performing this function. RF circuitry 2008 and audio circuitry 2010 are coupled to processing system 2004 via peripherals interface 2016. Interface 2016 includes various known components for establishing and maintaining communication between peripherals and processing system 2004. Audio circuitry 2010 is coupled to audio speaker 2050 and microphone 2052 and includes known circuitry for processing voice signals received from interface 2016 to enable a user to communicate in real-time with other users. In some embodiments, audio circuitry 2010 includes a headphone jack (not shown).

Peripherals interface 2016 couples the input and output peripherals of the system to processor 2018 and computer-readable medium 2001. One or more processors 2018 communicate with one or more computer-readable mediums 2001 via controller 2020. Computer-readable medium 2001 can be any device or medium that can store code and/or data for use by one or more processors 2018. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 run various software components stored in medium 2001 to perform various functions for system 2000. In some embodiments, the software components include operating system 2022, communication module (or set of instructions) 2024, touch processing module (or set of instructions) 2026, graphics module (or set of instructions) 2028, one or more applications (or set of instructions) 2030, and fingerprint sensing module (or set of instructions) 2038. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, medium 2001 may store a subset of the modules and data structures identified above. Furthermore, medium 2001 may store additional modules and data structures not described above.

Operating system 2022 includes various procedures, sets of instructions, software components and/or drivers for controlling and managing general system tasks (e.g., memory management, storage device control, power management, etc.) and facilitates communication between various hardware and software components.

Communication module 2024 facilitates communication with other devices over one or more external ports 2036 or via RF circuitry 2008 and includes various software components for handling data received from RF circuitry 2008 and/or external port 2036.

Graphics module 2028 includes various known software components for rendering, animating and displaying graphical objects on a display surface. In embodiments in which touch I/O device 2012 is a touch sensitive display (e.g., touch screen), graphics module 2028 includes components for rendering, displaying, and animating objects on the touch sensitive display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 2026 includes various software components for performing various tasks associated with touch I/O device 2012 including but not limited to receiving and processing touch input received from I/O device 2012 via touch I/O device controller 2032.

System 2000 may further include fingerprint sensing module 2038 for performing the method/functions as described herein in connection with FIG. 1. Fingerprint sensing module 2038 may at least be executed, or otherwise function, to perform various tasks associated with the fingerprint sensor, such as receiving and processing fingerprint sensor input. The fingerprint sensing module 2038 may also control certain operational aspects of the fingerprint sensor 2042, such as its capture of fingerprint data and/or transmission of the same to the processor 2018 and/or secure processor 2040. Module 2038 may also interact with the touch I/O device 2012, graphics module 2028 or other graphical display. Module 2038 may be embodied as hardware, software, firmware, or any combination thereof. Although module 2038 is shown to reside within medium 2001, all or portions of module 2038 may be embodied within other components within system 2000 or may be wholly embodied as a separate component within system 2000.

I/O subsystem 2006 is coupled to touch I/O device 2012 and one or more other I/O devices 2014 for controlling or performing various functions. Touch I/O device 2012 communicates with processing system 2004 via touch I/O device controller 2032, which includes various components for processing user touch input (e.g., scanning hardware). One or more other input controllers 2034 receives/sends electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 displays visual output to the user in a GUI. The visual output may include text, graphics, video, and any combination thereof. Some or all of the visual output may correspond to user-interface objects. Touch I/O device 2012 forms a touch-sensitive surface that accepts touch input from the user. Touch I/O device 2012 and touch screen controller 2032 (along with any associated modules and/or sets of instructions in medium 2001) detects and tracks touches or near touches (and any movement or release of the touch) on touch I/O device 2012 and converts the detected touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad), the user may indirectly interact with graphical objects that are displayed on a separate display screen embodied as I/O device 2014.

Touch I/O device 2012 may be analogous to the multi-touch sensitive surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

Embodiments in which touch I/O device 2012 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 also includes power system 2045 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 2016, one or more processors 2018, and memory controller 2020 may be implemented on a single chip, such as processing system 2004. In some other embodiments, they may be implemented on separate chips.

In addition to the foregoing, the system 2000 may include a secure processor 2040 in communication with a fingerprint sensor 2042, via a fingerprint I/O controller 2044. The secure processor 2040 may be implemented as one or more processing units. The operation of these various elements will now be described.

The fingerprint sensor 2042 may operate to capacitively capture a series of images, or nodes. When taken together, these nodes may form a fingerprint. The full set of nodes may be referred to herein as a "mesh."

Each node in the mesh may be separately captured by the fingerprint sensor 2042, which may be an array sensor. Generally, there is some overlap between images in nodes representing adjacent portions of a fingerprint. Such overlap may assist in assembling the fingerprint from the nodes, as various image recognition techniques may be employed to use the overlap to properly identify and/or align adjacent nodes in the mesh.

Sensed fingerprint data may be transmitted through the fingerprint I/O controller 2044 to the processor 2018 and/or the secure processor 2040. In some embodiments, the data is relayed from the fingerprint I/O controller 2044 to the secure processor 2040 directly. The fingerprint data is encrypted, obfuscated, or otherwise prevented from being accessed by an unauthorized device or element, by any of the fingerprint sensor 2042, the fingerprint I/O controller 2044 or another element prior to being transmitted to either processor. The secure processor 2040 may decrypt the data to reconstruct the node. In some embodiments, unencrypted data may be transmitted directly to the secure processor 2040 from the fingerprint controller 2044 (or the sensor 2042 if no controller is present). The secure processor may then encrypt this data.

Fingerprint data, either as nodes or meshes, may be stored in the computer-readable medium 2001 and accessed as necessary. In some embodiments, only the secure processor 2040 may access stored fingerprint data, while in other embodiments either the secure processor or the processor 2018 may access such data.

With reference to FIG. 1, aspects of example continual authorization for secured functions implementations will now be described in specific detail. As described above, whether or not a function is secured (as well as what kind of credentials are required for authentication, whether a grace period is provided or whether credentials must be continuously provided during execution of a secured function, and other such aspects) may be determined based on one or more defaults, user preferences, enterprise policies, function settings, and so on. For example, an enterprise server may include a policy that email clients do not require authentication when executing on computing devices connected to an enterprise communication network, but that such email clients require continual fingerprint authentication when executing on computer devices connected to other communication networks.

By way of another example, a user may configure one or more preferences on the user's computing device regarding a shopping program that facilitates purchases via the Internet. The user may configure various preferences such that the computing device does not require authentication for the shopping program for purchases under a first threshold amount (such as twenty dollars), the computing device requires the user provide a password (and provides the user a grace period of fifteen minutes after providing the password) for purchases between the first threshold and a second threshold amount (such as three hundred dollars), and the computing device requires the user constantly provide the user's fingerprint for purchases in excess of the second threshold. In this way, the user may require that more stringent authentication is performed when the consequences of unauthorized usage would be more severe.

In a third example, a parent may configure a computing device that is operable to play various media files (such as image files, movies, and/or other such audio/visual files) to operate according to one or more parental control settings. The computing device may also be configured to obtain (such as for purchase or rental) one or more media files for play on the computing device. In such a case, the computing device may include one or more default settings that require no authorization for obtaining media files below a first rating specified in the parental control settings (such as G rated content), require the user to provide a password before obtaining media files below a second rating (such as R rated content) within a grace period (such as one hour), and/or require the user to constantly provide a fingerprint before obtaining media files that exceed the second rating (such as NC-17 rated content when the second rating corresponds to R rated content). In this way, the user may require the computing device utilizing increasing stringent authentication measures when obtaining increasingly adult content.

In a fourth example, a parent may configure a computing device to require different levels of security based on the time of day. The parent may work during the daytime and may only usually be home during the night. The parent may wish to restrict Internet access for the parent's children to when the parent will be home. As such, the parent may configure the computing device to require the parent's password (and provide a grace period of two hours as specified by the parent) during evening hours when the parent will be home. In this way, the parent's children may need to request the parent provide the password before being able to use the Internet so that the parent is aware of the usage. However, the parent may also configure the computing device to require the parent to constantly provide the parent's fingerprint for Internet usage during the daytime. As the parent is not typically home during the daytime, requiring the parent to constantly provide the parent's fingerprint for Internet usage will prevent the parent's children from guessing the parent's password. In additional such a configuration would allow the parent to use the Internet during the daytime if the parent happens to come home uncharacteristically without the possibility of the Internet still being usable by the parent's children during a grace period after the parent returns to work. In this way, the parent has powerful yet flexible options for configuring the security of the computing device.

By way of a fifth example, a parent may provide a mobile computing device to the parent's child. The parent may associate a software application purchasing account that can be utilized to electronically obtain fee-based software applications for the mobile computing device with the mobile computing device. However, the parent may not wish the child to purchase software applications without specific permission and the parent may not trust that the child could not guess a password. As such, the parent may configure the mobile computing device to require the parent to constantly provide the parent's fingerprint during any use of the software application purchasing account. In this way, the parent will always be aware when the software purchasing account is used. Further, the parent can ensure that the parent does not authorize purchase of one software application and then the child utilize a provided grace period after the parent is no longer paying attention to purchase more software applications.

In a sixth example, a computing device may be configured with one or more default settings regarding software installation. According to the default settings, the computing device may not require authentication for installation of software components that include a certificate from a software certification agency that is trusted by the computing device. However, the default settings may require that the user constantly provide the user's facial image during installation of any software component that does not bear such a certificate from a software certification agency trusted by the computing device (such as a software component that does not have a certificate, a software component that bears a certificate from an unknown or non-trusted software certification agency, a software component that bears a possibly fraudulent certificate, and so on). In this way, the computing device may minimize the hassle to users when installing software components that are likely safe while still making sure users are aware when components may not be safe. Further, the computing device may also in this way be able to ensure that when potentially unsafe components are installed that they are not installed by unauthorized users.

In a seventh example, a cellular telephone may be configured to charge by the minute for usage. As the phone may operate in a "pay as you go" mode where a credit card associated with a user of the phone may be charged for any usage, the phone's service provider may configure one or more options that require the phone's user to constantly provide the user's fingerprint during all phone usage. In this way, usage of the phone can be restricted only to the user who has provided the credit card associated with charges. Further, the phone's service provider may be able to prove that the user legitimately incurred the charges related to the phone usage in case any dispute regarding usage or charges arises.

In an eighth example, a computing device hosting a litigation management system may serve documents or other materials related to one or more litigation matters. In some cases, some of the materials may be subject to a protection order and may only be legally authorized for access through the litigation management system for certain parties (such as attorneys involved in the litigation as opposed to the client of the litigation, support staff, or attorneys who may have a conflict regarding the subject of the litigation). As such, the computing device may be configured to require a user to constantly provide a fingerprint when accessing such materials so that the computing device can ensure that only authorized individuals access the materials instead of individuals that may have been granted access to the computing device by authorized individuals but may not themselves be allowed under the protection order to access the materials.

In some implementations the touch I/O device may not be directly connected to the computing device. For example, a parent may configure the smart phone of the parent's child with a content purchasing account. However, the parent may want to require that the parent constantly provide the parent's fingerprint whenever the content purchasing account is utilized via the child's smart phone but may not wish to always have to be physically present for such purchasing.

In such a case, the parent may configure the child's smart phone to contact the parent's smart phone whenever the content purchasing account is to be utilized. Based on a prompt provided by the parent's smart phone (which may include notifications regarding the child's activities related to the content purchasing account), the parent may then provide the parent's fingerprint constantly to the parent's smart phone during the child's use of the child's smart phone to access the content purchasing account. The parent's smart phone may keep the child's smart phone informed as to whether or not the parent's finger is currently on the touch I/O device of the parent's smart phone. In this way, the parent may be able to control use of the content purchasing account on the child's smart phone without actually having to always be present at the child's smart phone when such account is utilized.

In various implementations, other biometric credentials other than fingerprints or facial images may be utilized. For example, in some cases, handprints, toe prints, foot prints, retinal images, iris images, and/or various other such biometric credentials may be utilized instead of fingerprints. Further, in various cases, combinations of one or more different types biometric credentials (possibly in further combination with other types of authentication credentials such as passwords) may be required.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium;

read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The present disclosure recognizes that personal information data, including biometric data, in the present technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data, that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

The invention claimed is:

1. A method of submitting a purchase request to an online commerce website using a computing device, the method comprising:
comparing a cost of the purchase request to a first threshold amount and a second threshold amount, the second threshold amount being greater than the first threshold amount;
selecting one of multiple types of authentication credentials based on the comparison of the cost of the purchase request;
receiving a first authentication credential at the computing device;
determining if the first authentication credential matches a reference authentication credential that is associated with the cost of the purchase request;
if the first authentication credential matches the reference authentication credential, determining if a first user is authorized to submit the purchase request;
transmitting the purchase request from the computing device to the online commerce website when the first user is authorized to submit the purchase request; and
providing a grace period of a given amount of time to receive, by the computing device, at least one additional purchase request having a cost that is less than the second threshold amount; wherein
at least the operation of comparing the cost of the purchase request to the first threshold amount and the second threshold amount occurs prior to the operation of transmitting the purchase request.

2. The method of claim 1, wherein the multiple types of authentication credentials comprises a first type of authentication credential and a different second type of authentication credential, wherein the first type of authentication credential is associated with the first threshold amount and the second type of authentication credential is associated with the second threshold amount.

3. The method of claim 2, wherein the first type of authentication credential comprises a password that is associated with the first user.

4. The method of claim 3, wherein the grace period is provided after the password matches a reference password that is associated with the first user.

5. The method of claim 2, wherein the second type of authentication credential comprises a biometric that is associated with the first user.

6. The method of claim 5, wherein receiving the first authentication credential comprises continuously receiving the biometric until the purchase request is completed.

7. The method of claim 1, further comprising:
if the first user is not authorized to submit the purchase request, transmitting a notification to an electronic device;
receiving a second authentication credential that is associated with a second user on the electronic device;
determining if the second authentication credential matches a reference authentication credential associated with the second user; and
transmitting the purchase request to the online commerce website when the second authentication credential matches the reference authentication credential associated with the second user.

8. The method of claim 7, wherein the second authentication credential comprises a biometric that is associated with the second user.

9. The method of claim 8, wherein receiving the second authentication credential on the electronic device comprises continuously receiving on the electronic device the biometric that is associated with the second user until the purchase request is completed.

10. A method of operating a computing device, the method comprising:
receiving, at the computing device, a purchase request that is associated with a first user;
comparing a cost of the purchase request to first and second threshold amounts;
when the cost of the purchase request is less than the first threshold amount, transmitting the purchase request to an online commerce website;
when the cost of the purchase request is between the first and second threshold amounts, selecting a first reference authentication credential that is associated with the first threshold amount;
when the cost of the purchase request is greater than the second threshold amount, selecting a different second reference authentication credential that is associated with the second threshold amount;
receiving an authentication credential at the computing device;
determining if the received authentication credential matches the selected reference authentication credential;
determining if the first user is authorized to submit the purchase request when the received authentication credential matches the selected reference authentication credential;
transmitting the purchase request to the online commerce website when the first user is authorized to submit the purchase request; and
providing a grace period of a given amount of time to receive, by the computing device, at least one additional purchase request having a cost that is less than the threshold amount associated with the selected authentication credential.

11. The method of claim 10, wherein the first reference authentication credential comprises a password that is associated with the first user.

12. The method of claim 10, wherein the different second reference authentication credential comprises a biometric that is associated with the first user.

13. The method of claim 10, wherein the different second reference authentication credential is associated with a second user.

14. The method of claim 13, further comprising:
prior to receiving the authentication credential, transmitting a notification to an electronic device if the first user is not authorized to submit the purchase request;
receiving the authentication credential on the electronic device; and
transmitting the purchase request to the online commerce website when the received authentication credential matches the second reference authentication credential.

15. The method of claim 14, wherein the second reference authentication credential comprises a biometric that is associated with the second user.

16. A computing device, comprising:
a processing unit;
a biometric sensor operably connected to the processing unit; and
a non-transitory storage medium storing instructions executable by the processing unit to:
compare a cost of a purchase request to a first threshold amount and a second threshold amount, the second threshold amount being greater than the first threshold amount;
select one of multiple types of authentication credentials based on the comparison of the cost of the purchase request;
determine if a received authentication credential matches a reference authentication credential that is associated with the cost of the purchase request;
transmit the purchase request to an online commerce website when the received authentication credential matches the reference authentication credential; and
provide a grace period of a given amount of time to receive at least one additional purchase request having a cost that is less than the second threshold amount; wherein
at least the operation of comparing the cost of the purchase request to the first threshold amount and the second threshold amount occurs prior to the operation of transmitting the purchase request.

17. The computing device of claim 16, wherein the non-transitory storage medium stores instructions executable by the processing unit to:
prior to transmitting the purchase request to the online commerce website, determine if a first user submitting the purchase request is authorized to submit the purchase request when the received authentication credential matches the reference authentication credential; and
transmit the purchase request to the online commerce website when the first user is authorized to submit the purchase request.

18. The computing device of claim 17, wherein the non-transitory storage medium stores instructions executable by the processing unit to:
if the first user is not authorized to submit the purchase request, transmit a notification to an electronic device; and
transmit the purchase request to the online commerce website when a second authentication credential associated with a second user matches a reference authentication credential associated with the second user.

* * * * *